United States Patent [19]

Encke

[11] Patent Number: 5,064,018

[45] Date of Patent: Nov. 12, 1991

[54] ARRANGEMENT OF A REAR-AXLE TRANSMISSION

[75] Inventor: Ernst-Ekkehard Encke, Altbach, Fed. Rep. of Germany

[73] Assignee: Daimler-Benz AG, Stuttgart, Fed. Rep. of Germany

[21] Appl. No.: 533,437

[22] Filed: Jun. 5, 1990

[30] Foreign Application Priority Data

Jun. 22, 1989 [DE] Fed. Rep. of Germany ....... 3920442

[51] Int. Cl.⁵ .............................................. B60K 17/04
[52] U.S. Cl. .................................. 180/360; 180/378; 180/382; 280/716
[58] Field of Search ............... 180/359, 360, 375, 378, 180/382, 905, 299; 280/716

[56] References Cited

U.S. PATENT DOCUMENTS

| 3,557,896 | 1/1971 | Mueller et al. | 180/360 |
| 3,603,421 | 9/1971 | Maeda et al. | 180/360 |
| 3,727,713 | 4/1973 | Van Winsen et al. | 180/360 |
| 4,432,428 | 2/1984 | Kondo et al. | 180/360 |
| 4,699,230 | 10/1987 | Solleder et al. | 180/378 |
| 4,714,132 | 12/1987 | Hattori et al. | 280/716 |

FOREIGN PATENT DOCUMENTS 1089626 11/1967 United Kingdom .

Primary Examiner—Kenneth R. Rice
Attorney, Agent, or Firm—Evenson, Wands, Edwards, Lenahan & McKeown

[57] ABSTRACT

A rear-axle transmission arrangement supports the transmission of at all fastening points and forms at least its output-side fastening points and forms by support bearings fixed to the body independently of the rear-axle support to improve driving comfort and handling performance. This arrangement permits vibrations resulting from the drive torque and a rising-up of rear-axle transmission and rear-axle support to be controlled better or be avoided. In addition, forces induced by the drive torque cannot bring about any shifts in the rear-axle support causing steering movements.

10 Claims, 2 Drawing Sheets

ARRANGEMENT OF A REAR-AXLE TRANSMISSION

BACKGROUND AND SUMMARY OF THE INVENTION

The present invention relates to an arrangement of a rear-axle transmission in the region of a rear-axle support on the underside of the body of a passenger car, and, more particularly, to an arrangement in which the transmission is flexibly supported on the input side at the rear axle support and at the output side at two spaced fastening points in a transverse direction of the vehicle.

An arrangement of a rear-axle transmission provided in the Mercedes-Benz Model 190 has the output-side fastening points of the rear-axle transmission provided on the rear cross member of the rear-axle support and its input-side mounting firmly bolted on the front cross member.

It is an object of the invention to further improve the good driving comfort and handling performance with the suspension of the rear-axle transmission.

The foregoing object has been achieved by forming output-side fastening points as supported bearings fixed to the body independently of the rear-axle support.

By virtue of the rear-axle transmission being supported flexibly and independently of the rear-axle support, at least on the output side, it has been possible now to create the preconditions for improved control of vibrations resulting from the drive torque and a rising-up of rear-axle transmission and rear-axle support.

Furthermore, the forces induced by the drive torque cannot bring about shifts in the flexibly supported rear-axle support causing steering movements, since the isolation of at least the output-side transmission supporting base from the rear-axle support has the effect that essentially only vertical forces are now introduced into the latter. In addition, any imbalances in the rear-axle transmission and meshing noises of its wheel set are no longer troublesomely transmitted to the rear-axle support.

At the same time, the flexible support bearings for the body-side linking of rear-axle support and rear-axle transmission can be designed specifically to requirements with regard to their movements and oscillations. It is possible for the bearings to be rubber springs or, if appropriate, air springs.

An alternative embodiment of the present invention in which the output-side bearings are arranged coaxially with respect to the rear, body-side flexible support bearings of the rear-axle support offers the advantage of not having to carry out any modifications for supporting the rear-axle transmission on the body side. Thus, it is now possible for the transmission output-side supporting base to be dimensioned favorably for the design of the corresponding support bearings. A presently preferred bearing design is to have the support bearings of the rear-axle support and rear-axle transmission section on a common receiving bolt fixed to the body.

The rear-axle transmission can be flexibly linked on the input side to a front cross member of the rear-axle support. Equally well, however, the input-side support bearing may also be fixed on the body side. Although such a measure requires an alteration on the body side to create a suitable bearing receptacle, it permits a complete detachment of rear-axle support and rear-axle transmission, which leads to optimum results from a vibrational viewpoint, since the rear-axle support and drive train can be completely isolated from each other.

BRIEF DESCRIPTION OF THE DRAWING

These and other objects, features and advantages of the present invention will become more apparent from a detailed description of a presently preferred embodiment when taken in conjunction with the accompanying drawings wherein.

DETAILED DESCRIPTION OF THE DRAWINGS

Figure 1:
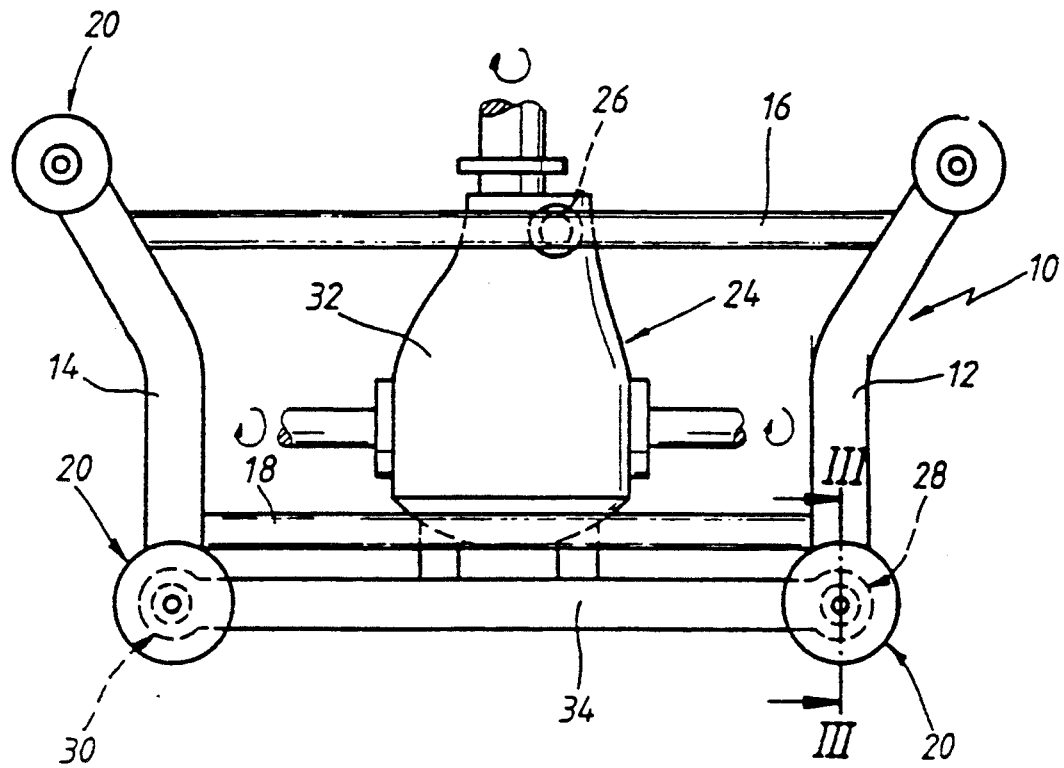
FIG. 1 is a plan view of a passenger car rear-axle support, shown schematically assigned to a rear-axle transmission.
Figure 3:
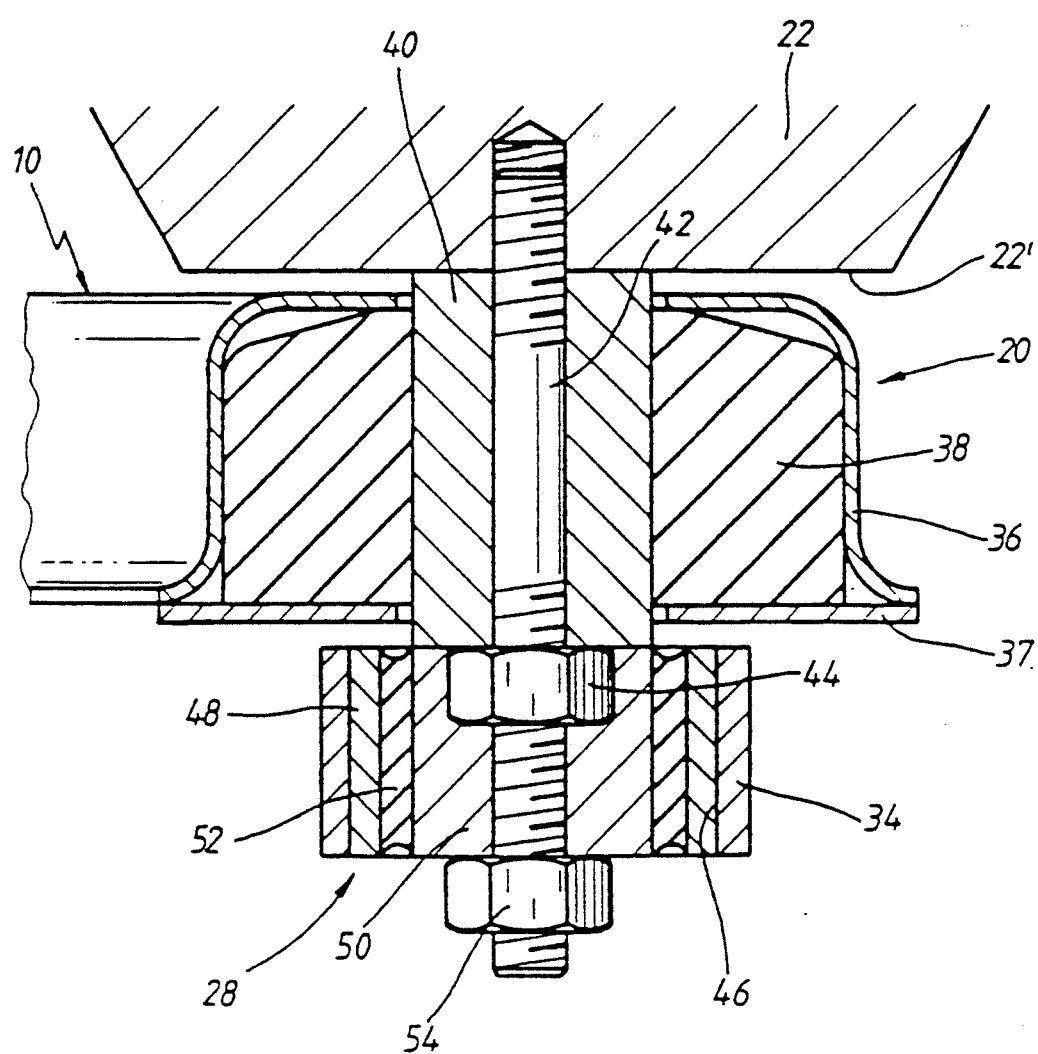
FIG. 3 is a section along the line III—III of FIG. 1 through a supporting bearing, but on a larger scale than FIG. 1.

The rear-axle support shown schematically in FIG. 1 is designated generally by the numeral 10 and has two side parts 12, 14 which are each adjacent to a longitudinal side of the vehicle. The side parts 12, 14 are interconnected by a front cross member 16 and a rear cross member 18. The side parts 12, 14 are provided at each of their ends with a support bearing 20 shown more clearly in FIG. 3, on a bearing receptacle 22, provided on the underside of the body.

The rear-axle support 10 is assigned a rear-axle transmission, denoted generally by the numeral 24, which is flexibly supported in a known manner at three fastening points. In particular, on the transmission 24 is linked at the input side a support bearing 26 to the underside of the front cross member 16 of the rear-axle support 10, and at the output side by two flexible support bearings 28, 30, spaced from each other in the transverse direction of the vehicle on the underside of the body. For this purpose, these support bearings 28, 30 are located in the region of the ends of a cross member 34 which is linked to and may be integral with the rear end of the transmission case 32.

Figure 2:
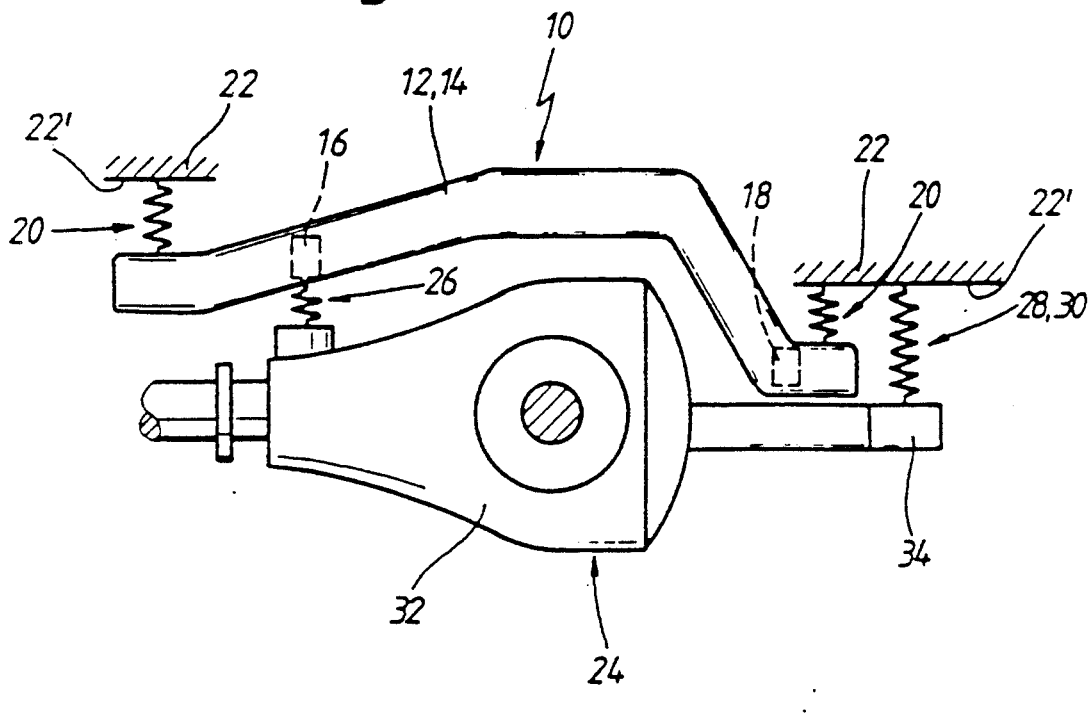
FIG. 2 is a side view of the arrangement shown in FIG. 1.

Preferably, the two output-side support bearings 28, 30 are arranged coaxially with respect to and detachably to the two rear support bearings 20 of the rear-axle support 10, provided at the body-side bearing receptacles 22. Alternatively, however, they may also be provided laterally offset from each other as shown in FIG. 2.

The support bearings 20 have an inversely cup-shaped bearing housing 36 which is arranged in each case on one of the side parts 12, 14 and into which an elastomeric element 38, preferably of rubber, is fitted. A hollow-cylindrical inner sleeve 40, passing axially through the support bearing 20, forms a bearing core, to which the elastomeric element 38 is cured. A receiving bolt 42 is screwed into the bearing receptacle 22 and, at the same time, receives one of the output-side support bearings 28, 30 of the rear-axle transmission 24. The inner sleeve 40 of the support bearing 20 is braced to the contact surface 22' of the bearing receptacle 22 by a tensioning nut 44 which is screwed onto an external thread of the receiving bolt 42.

The output-side support bearings 28, 30 are each inserted into an end piece of a bore 46 which passes through the cross member 34. They comprise an outer bearing shell 48 and an inner sleeve 50, forming a bearing core, an elastomeric element 52, preferably of rubber, cured in between the inner sleeve 50 and the bearing shell 48. The inner sleeve 50 permits the support bearings 28, 30 to be fitted onto a respective one of the bearing bolts 42. A tensioning nut 54 axially bores the inner sleeve 50 with the inner sleeve 40 which projects with its two sleeve ends beyond the bearing housing 36. As a result, both a touching of the bearing housing 36 and the contact surface 22' of the bearing receptacles 22 and a touching of a closure plate 37 of the bearing housing 36 and the cross member 34 are avoided. In addition, the inner sleeve 40 passes through the bearing housing 36, 37 with radial play, so that the rear-axle support 10 is mounted both radially and axially compliantly, with respect to the receiving bolt 42. This is also the case for the support bearings 28, 30 with respect to the coaxially arranged support bearings 20.

The two bearing inner sleeves 40, 50 could also be of an integral piece. However, the illustrated split sleeve 40, 50 offers the advantage of a favorable assembly of rear-axle support 10 and rear-axle transmission 24.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A rear-axle transmission arrangement in a rear axle support region on an underside of a passenger car body, in which the transmission is flexibly supported on an input side at the rear-axle support and on an output side at two fastening points spaced in a transverse direction of the vehicle, wherein fastening points at the output side support bearings fixed to the body independently of the rear-axle support, wherein the output-side support bearings are coaxial to rear, body-side flexible support bearings of the rear-axle support.

2. The arrangement according to claim 1, wherein the coaxial support bearings of rear-axle support and rear-axle transmission are seated on a common receiving bolt fixed to the body.

3. The arrangement according to claim 1, wherein the support bearings of the rear-axle support have inversely cup-shaped bearing housing arranged on respective side parts of the rear axle support, and an elastomeric element fitted therein.

4. The arrangement according to claim 3, wherein a hollow-cylindrical inner sleeve passes axially through the support bearings of the rear-axle support, and the elastomeric element is cured thereto.

5. The arrangement according to claim 4, wherein a receiving bolt is screwed into a bearing receptacle at the body and receives a respective one of the output side support bearings of the rear-axle transmission.

6. The arrangement according to claim 5, wherein a tensioning nut braces the inner sleeve to a contact surface of the bearing receptacle and screwed onto an external thread of the receiving bolt.

7. A rear-axle transmission arrangement in a rear axle support region on an underside of a passenger car body, in which the transmission is flexibly supported on an input side at the rear-axle support and on an output side at two fastening points spaced in a transverse direction of the vehicle, wherein fastening points at the output side support bearings fixed to the body independently of the rear-axle support wherein the output-side support bearings are inserted into an end piece of a bore which passes through a cross member which is linked to a transmission case rear end, the output-side support bearings comprise an outer bearing shell, an inner sleeve, and an elastomeric element between the inner sleeve and the bearing shell, the support bearings of the rear-axle support have an inversely cup-shaped bearing housing arranged on respective side parts of the rear axle support, and an elastomeric element fitted therein, a hollow-cylindrical inner sleeve passes axially through the support bearings of the rear-axle support, and the elastomeric element is cured thereto, and a tensioning nut axially braces the inner sleeve with the inner sleeve, and the inner sleeve extends beyond the bearing housing so as to prevent, on one hand, touching the bearing housing and the contact surface and, on the other hand, a touching of a closure plate of the bearing housing and the cross member.

8. The arrangement according to claim 7, wherein the inner sleeve passes through the bearing housing with radial play.

9. The arrangement according to claim 8, wherein a receiving bolt is screwed into a bearing receptacle at the body and receives a respective one of the output side support bearings of the rear-axle transmission.

10. The arrangement according to claim 9, wherein a tensioning nut braces the inner sleeve to a contact surface of the bearing receptacle and screwed onto an external thread of the receiving body.

* * * * *